(12) United States Patent
Bachner et al.

(10) Patent No.: US 7,500,940 B2
(45) Date of Patent: Mar. 10, 2009

(54) SPOUT APPLICATOR

(75) Inventors: Jerry G. Bachner, Barrington, IL (US); David R. Anchor, Union, IL (US)

(73) Assignee: NIMCO Corporation, Crystal Lake, IL (US)

( * ) Notice: Subject to any disclaimer, the term of this patent is extended or adjusted under 35 U.S.C. 154(b) by 0 days.

(21) Appl. No.: 11/244,216

(22) Filed: Oct. 5, 2005

(65) Prior Publication Data

US 2006/0073958 A1 Apr. 6, 2006

Related U.S. Application Data

(60) Provisional application No. 60/616,431, filed on Oct. 5, 2004.

(51) Int. Cl.
*B31B 1/84* (2006.01)
(52) U.S. Cl. .......... 493/87; 493/121; 493/214; 53/410; 53/133.2
(58) Field of Classification Search ........... 493/52, 493/84, 87, 121, 214, 102; 53/133.2, 133.1, 53/410, 422; 156/69
See application file for complete search history.

(56) References Cited

U.S. PATENT DOCUMENTS

| | | | |
|---|---|---|---|
| 3,633,470 A | 1/1972 | Bingham | |
| 3,795,158 A * | 3/1974 | Morita | 81/3.32 |
| 3,812,572 A | 5/1974 | Weikert | |
| 4,020,848 A * | 5/1977 | DiCicco | 606/188 |
| 4,386,923 A | 6/1983 | Okushita | |
| 4,456,118 A | 6/1984 | Kauffman et al. | |
| 4,601,425 A | 7/1986 | Bachner | |
| 4,614,079 A | 9/1986 | Ida et al. | |
| 4,788,811 A | 12/1988 | Kawajiri et al. | |
| 4,949,882 A | 8/1990 | Take | |
| 4,964,562 A | 10/1990 | Gordon | |
| 5,169,374 A | 12/1992 | Abrams et al. | |
| 5,219,320 A | 6/1993 | Abrams et al. | |
| 5,267,934 A | 12/1993 | Pape et al. | |
| 5,366,433 A | 11/1994 | McCormick | |
| 5,435,803 A | 7/1995 | Owen et al. | |
| 5,484,374 A | 1/1996 | Bachner et al. | |
| 5,597,285 A * | 1/1997 | Meyer et al. | 414/798.6 |
| 5,601,669 A | 2/1997 | Moody et al. | |
| 5,653,832 A * | 8/1997 | Thompson et al. | 156/73.1 |
| 5,759,143 A | 6/1998 | Blain et al. | |
| 5,770,009 A | 6/1998 | Blain et al. | |
| 5,819,504 A | 10/1998 | Giacomelli et al. | |
| 5,964,687 A | 10/1999 | Rogalski et al. | |
| 5,983,599 A | 11/1999 | Krueger | |
| 6,079,185 A * | 6/2000 | Palaniappan et al. | 53/412 |
| 6,085,489 A | 7/2000 | Bachner et al. | |

(Continued)

FOREIGN PATENT DOCUMENTS

GB 2238287 A 5/1991

(Continued)

*Primary Examiner*—Paul R Durand
(74) *Attorney, Agent, or Firm*—Jenner & Block LLP

(57) ABSTRACT

An apparatus for attaching a spout having a flange to a preformed hole in an open-ended container. The apparatus comprises of an applicator system and a mandrel. The applicator system is able to translate a linear motion to an arc motion. The mandrel is attached to the applicator system. The mandrel is adapted to releasably engage the spout.

10 Claims, 16 Drawing Sheets

U.S. PATENT DOCUMENTS

| | | |
|---|---|---|
| 6,151,861 A | 11/2000 | Magri |
| RE37,025 E | 1/2001 | Moody et al. |
| 6,321,813 B1 | 11/2001 | Miyajima et al. |
| 6,378,271 B1 * | 4/2002 | Skinner et al. ............... 53/410 |
| 6,463,715 B1 | 10/2002 | Petersson |
| 6,467,238 B1 * | 10/2002 | Lees et al. ................ 53/133.2 |
| 6,662,524 B2 * | 12/2003 | Annehed et al. ........... 53/133.2 |
| 6,722,102 B1 | 4/2004 | Pape et al. |
| 7,032,363 B1 * | 4/2006 | Annehed et al. .............. 53/412 |
| 2001/0052215 A1 | 12/2001 | Hiramoto et al. |
| 2001/0052216 A1 | 12/2001 | Hiramoto et al. |
| 2002/0073648 A1 | 6/2002 | Sevcik et al. |
| 2003/0046897 A1 | 3/2003 | Kitajima et al. |

FOREIGN PATENT DOCUMENTS

| | | |
|---|---|---|
| JP | 02296632 A | 12/1990 |
| JP | 3-288636 A | 12/1991 |
| JP | 06001305 A | 1/1994 |
| WO | WO 95/10408 | 4/1995 |

* cited by examiner

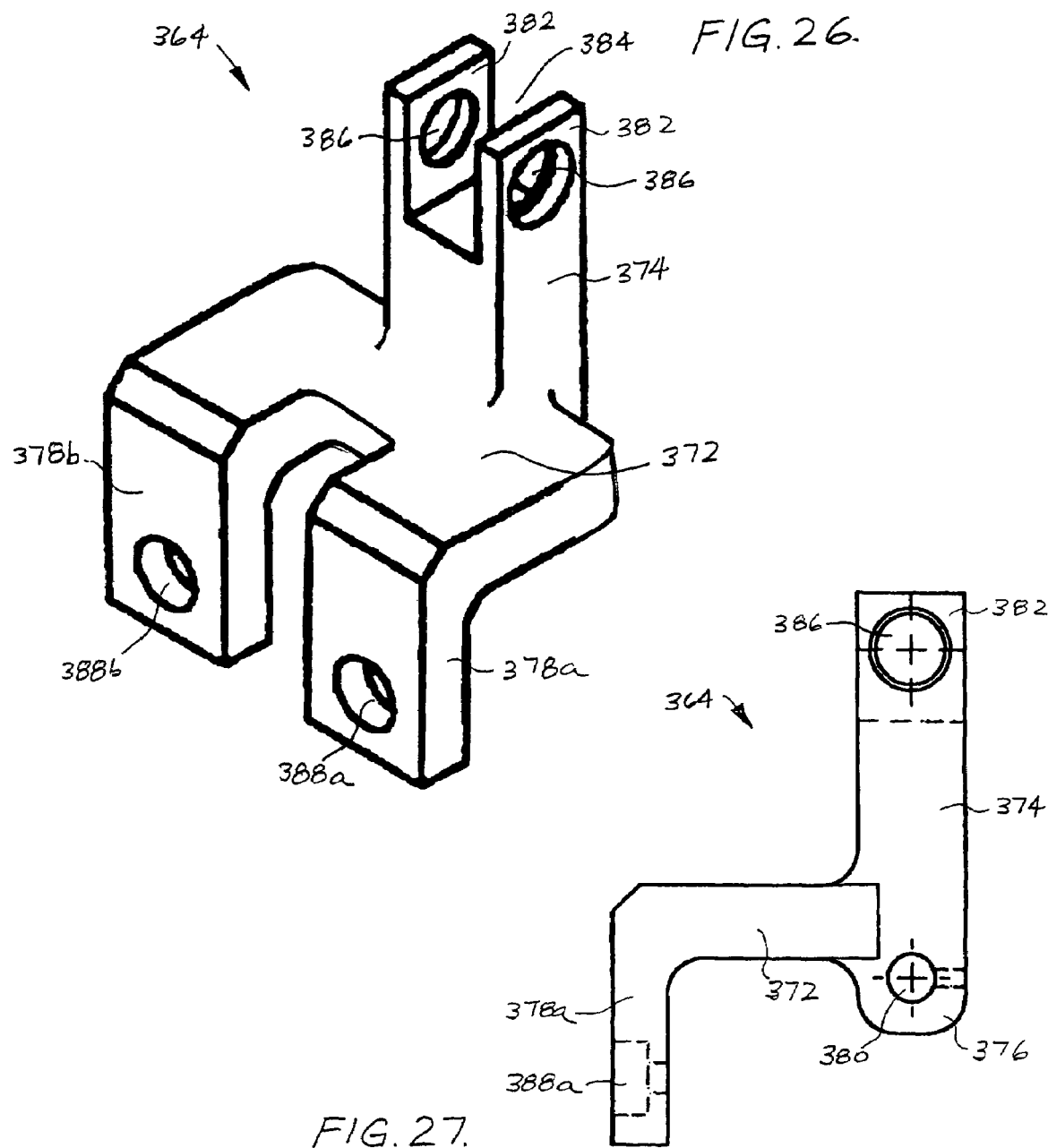

SPOUT APPLICATOR

This application claims the benefit, pursuant to Title 35 U.S.C. § 120, of provisional application Ser. No. 60/616,431 filed Oct. 5, 2004, the content of which is hereby incorporated by reference herein.

BACKGROUND OF THE INVENTION

This invention relates to machinery for manufacturing containers, and in particular to machinery for attaching reclosable spouts to containers such as paperboard cartons or flexible packaging used for holding liquids, solids and the like.

A common and useful type of container is the paperboard carton having a gabled top. Examples of such cartons include the everyday milk and juice cartons. In recent years, these cartons have been used for numerous other products, including foods, beverages and detergents. These cartons are typically coated or laminated with a heat-sealable plastic, which is used by manufacturers to seal the cartons.

In the past, the contents of these cartons are dispensed by ripping open the gable top and unfolding a pourable spout. Once the carton is ripped open, it cannot be tightly resealed. To address this problem, cartons have been devised with reclosable spouts. These spouts are also referred to in the field as fitments, closures and caps. For convenience, they are referred to in this Application as simply "spouts".

A conventional spout is opened and closed by means of a removable cap, snap, hatch or the like. In the case of a capped spout, a person using the carton removes the cap to dispense the contents of the carton (typically a beverage). Because the carton has not been torn open, the contents can be tightly resealed.

Cartons having reclosable spouts are typically manufactured with automated machinery (often referred to as "packaging machinery") which forms the carton from a flat piece (or "blank") of paperboard or other suitable material. After the carton has been partially formed (but not filled or sealed), the reclosable spout is attached. A typical spout consists of a plastic tubular cylinder having a mounting flange at one end and a threaded, removable cap (or other conventional closure) at the other. The spout is mounted from inside the carton through a preformed hole formed in the paperboard blank so that the capped-end extends outward, while the flange abuts the interior side of the carton wall. The flange is then ultrasonically welded to the wall of the carton. Examples of these types of containers and spouts are provided by U.S. Pat. No. 4,964,562, issued on Oct. 23, 1990 to Gordon, and U.S. Pat. No. 4,601,425, issued on Jul. 22, 1986 to Bachner.

The component of packaging machinery which attaches spouts to cartons is often referred to as an "applicator" or an "applicator machine". U.S. Pat. No. 5,601,669, issued on Feb. 11, 1997 to Moody et al., discloses an applicator machine having an arm that picks up a spout and pivots inside the open end of a carton to line up the spout with a preformed hole in the carton. The arm is then moved transversely to insert the spout through the hole in the carton. This type of applicator machine requires two separate distinct motions to move the spout from the location it was picked up by the arm to the location where the spout is inserted through the hole of the carton: one motion to pivot the arm inside the open end of the carton to line up the spout with the hole of the carton and another motion to move the spout transversely to insert the spout through the hole. To accomplish the two separate distinct motions, this type of applicator machine typically requires two air cylinders. U.S. Pat. No. 5,759,319 to Moody, U.S. Pat. No. 6,662,524 to Annehed and U.S. Pat. No. 5,819,504 to Glacomelli similarly disclose multiple distinct motions to move the spout from the location where spout was picked up to the location where the spout is inserted through the hole of the carton.

BRIEF DESCRIPTION OF THE DRAWINGS

FIG. 26 is a perspective view of the pivot arm of the second alternative spout applicator machine as shown in FIG. 24; and FIG. 27 is a side view of the pivot arm of the second alternative spout applicator machine as shown in FIG. 24.

DETAILED DESCRIPTION OF THE DRAWINGS

Figure 1:
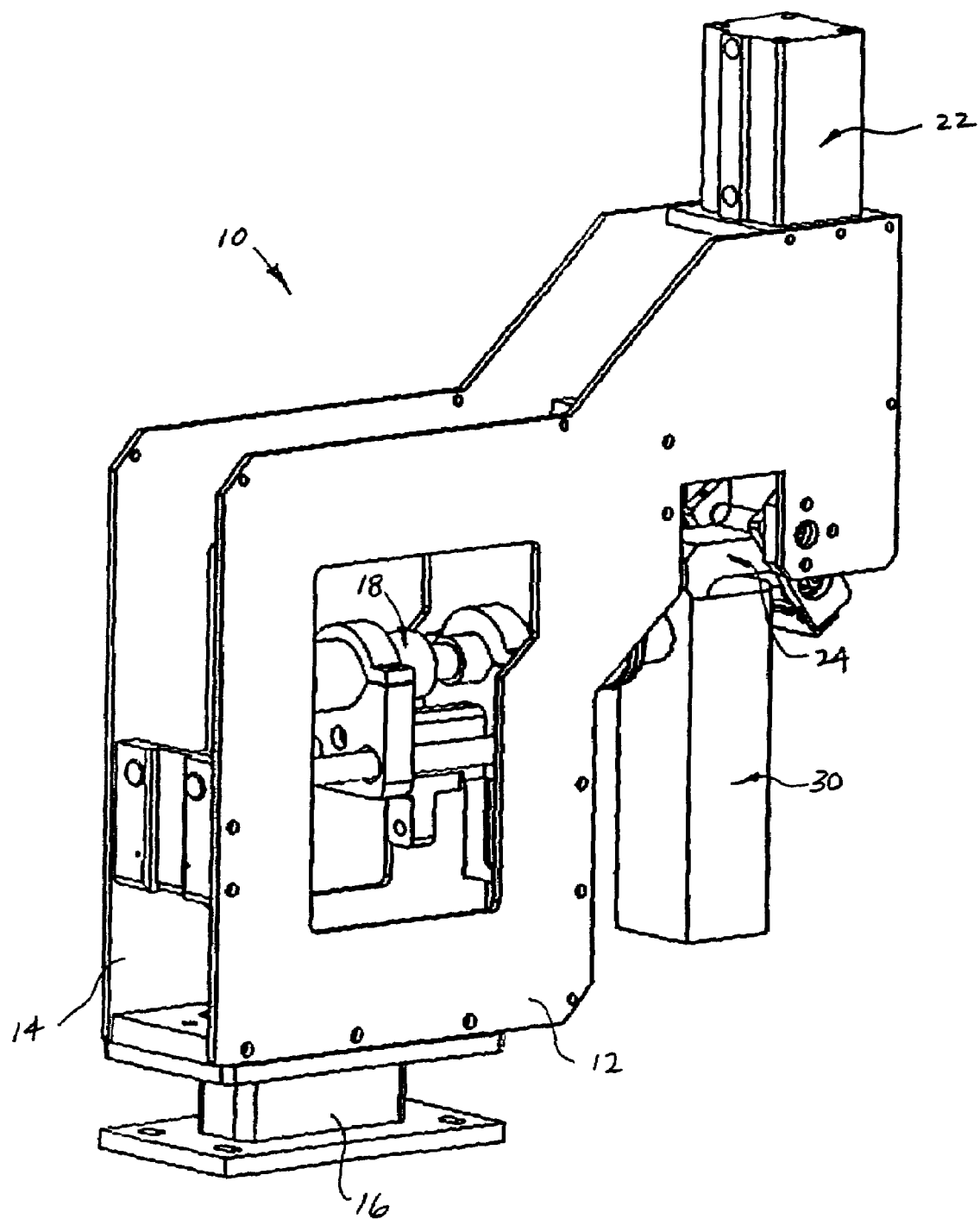
FIG. 1 is a front perspective view of a spout applicator machine in accordance to the present invention.
Figure 2:
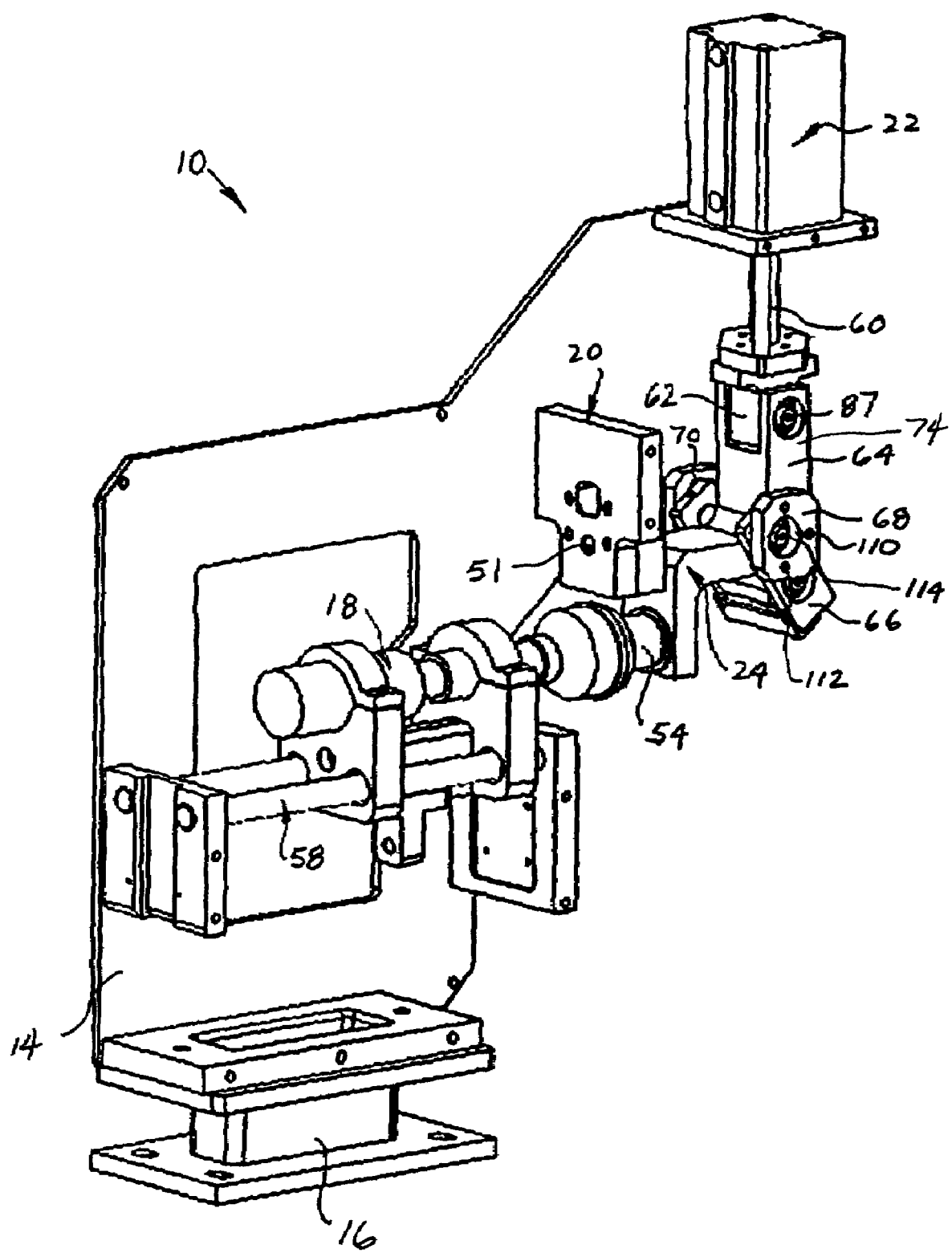
FIG. 2 is a front perspective view of the spout applicator machine as shown in FIG. 1 with one of the side plates removed.
Figure 3:
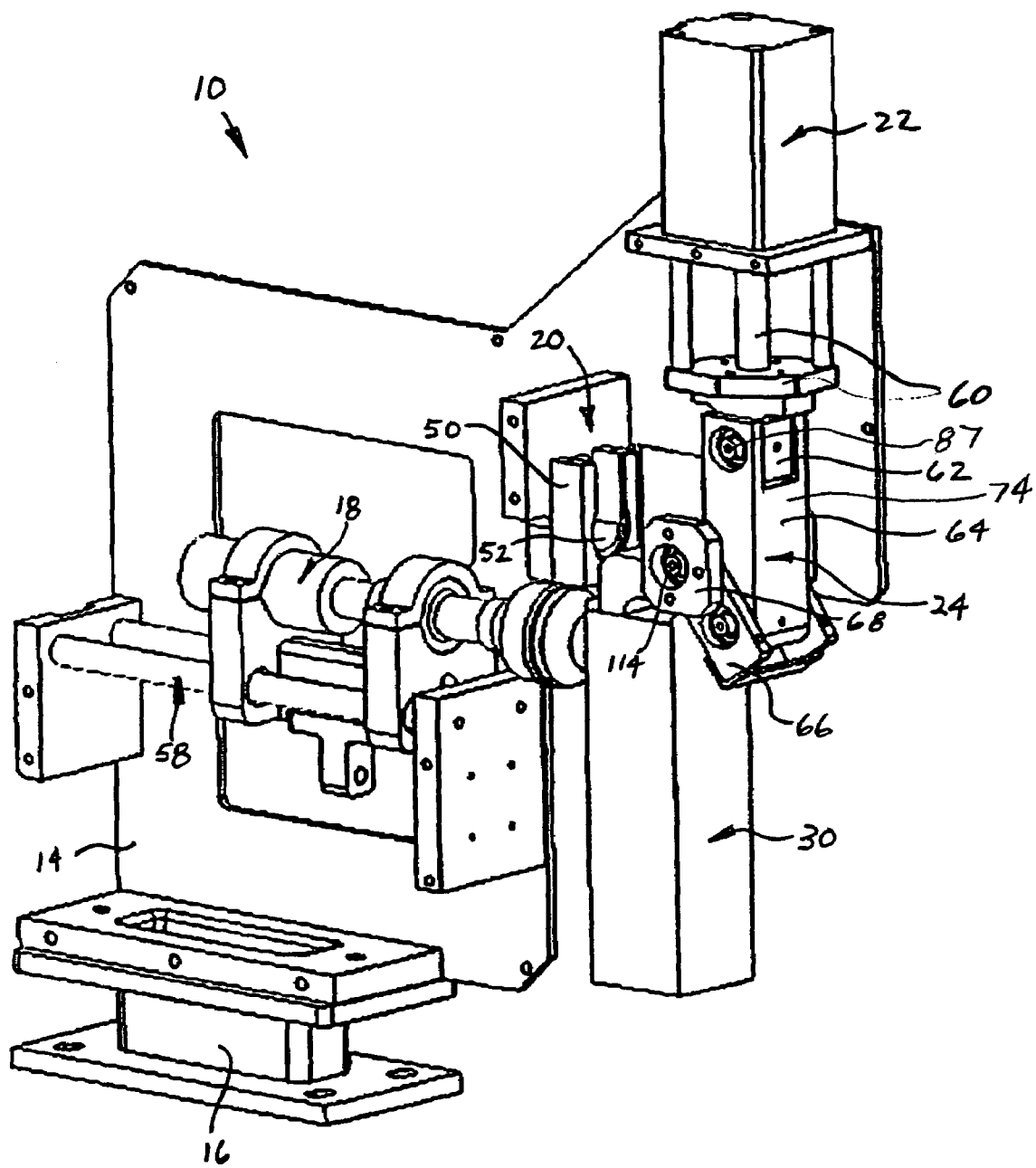
FIG. 3 is a rear perspective view of the spout applicator machine as shown in FIG. 1 with one of the side plates removed.

FIGS. 1-3 are perspective views of a spout applicator machine 10 in accordance to the present invention. The spout applicator machine 10 includes two side plates 12,14 mounted on a stand 16 to form the housing of the spout applicator machine 10. For the purpose of describing the present invention, the "housing" of the spout applicator machine is the portion of the spout applicator machine that remains stationary during its operation. The housing may, while not necessarily, provide the structural support for the movable or functional elements of spout applicator machine 10. Positioned and located in between the two side plates 12,14 are an ultrasonic sealer 18, a feed system 20, a linear actuator 22, and an applicator system 24. The overall function of the spout applicator machine 10 is to insert and attach a spout 36 to a folded open-ended paperboard carton 30. It should be noted that while the spout applicator machines of this embodiment and the following embodiments are described as inserting and attaching a spout to a folded open-ended paperboard carton for illustrative purposes, it remains within the spirit and scope of the present invention to use the spout applicator machines to insert and attach a spout to an open-ended flexible packaging, which may be formed of films or foils. The term "container" as used in this patent application to describe the present invention includes, cartons, packaging and other known types of containers used for holding liquids, solids and the like.

Figure 4:
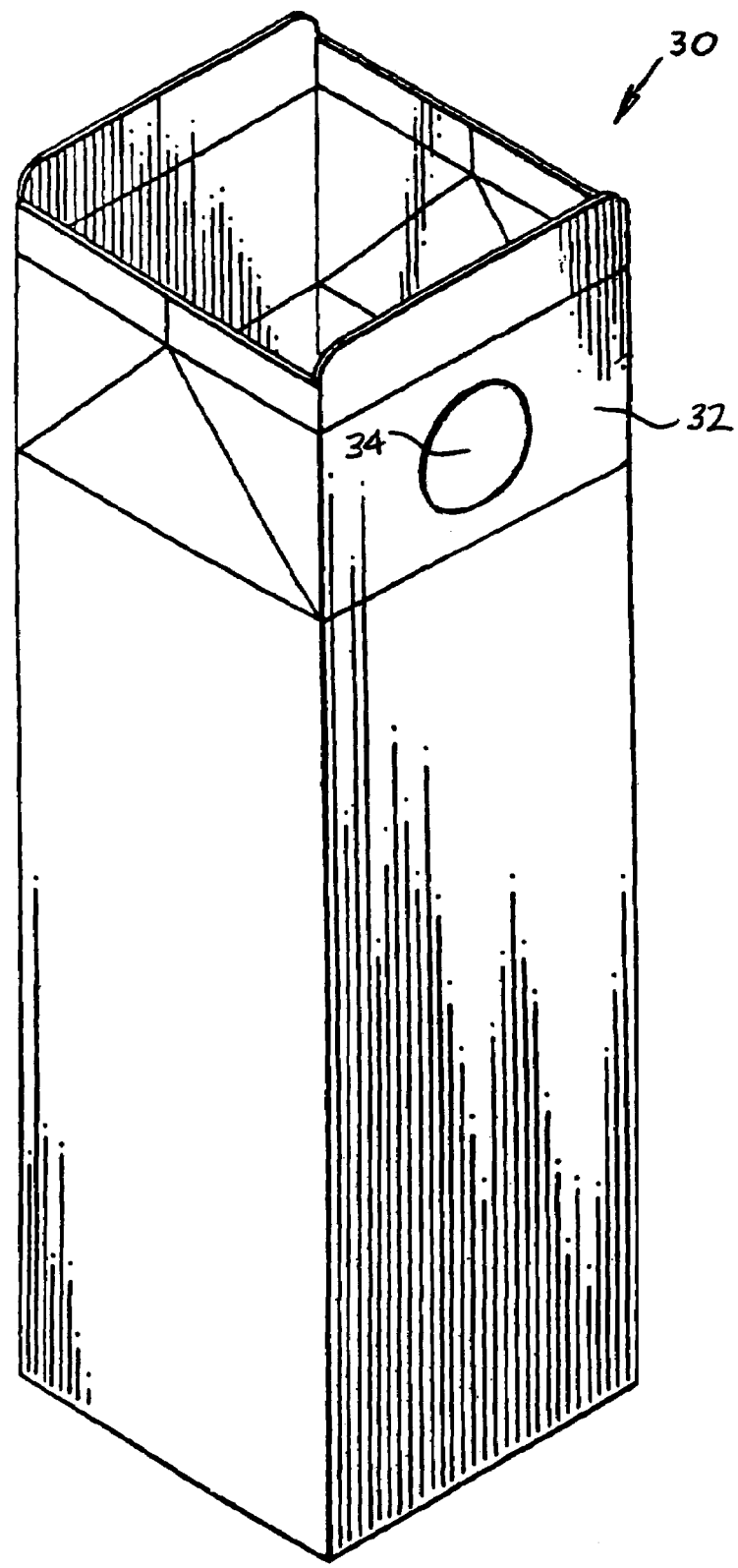
FIG. 4 is a perspective view of a carton prior to the installation of a spout.
Figure 5:
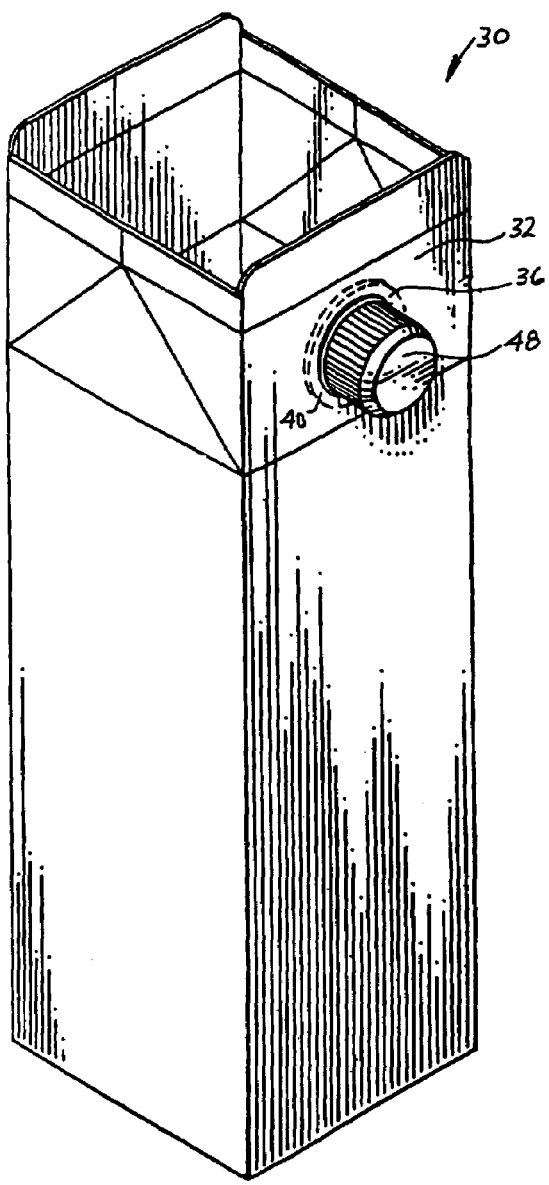
FIG. 5 is a perspective view of the carton as shown in FIG. 4 with a spout installed thereon.

FIG. 4 is perspective view of a folded open-ended paperboard carton 30. The paperboard carton 30 is laminated with heat-sealed plastic. The interior of the paperboard carton may also be laminated with barrier material such as metal or other material. A die cut hole 34 is formed completely through a panel 32 of the carton 30 for snugly receiving a spout 36. FIG. 5 is a perspective view of the folded paperboard carton 30 with a reclosable spout 36 inserted through the die cut hole 34.

Figure 6:
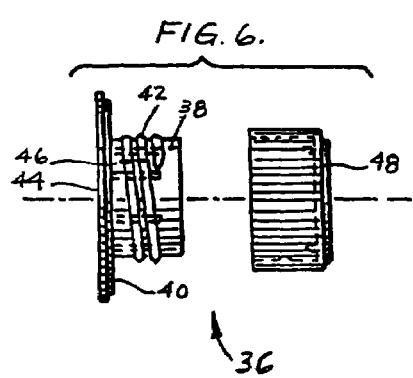
FIG. 6 is an exploded side view of the spout as shown in FIG. 5.

FIG. 6 is an exploded side view of the reclosable spout 36. The spout 36 includes a tubular section 38 and a mounting flange 40 for mounting the spout to the carton 30. The exterior of the tubular section 38 is threaded 42 for receiving a removable cap 48. The interior of the tubular section 38 defines a cylindrical cavity 46 extending axially inwardly from an entrance 44 defined in the mounting flange 40. As discussed below in greater detail, the spout 36 is inserted through the die cut hole 34 from the interior of the carton 30 so that the tubular end section 38, and the cap 48 attached thereon, extends outwardly from the panel 32 as illustrated in FIG. 5. The spout 36 is inserted until the mounting flange 40 abuts the interior side of panel 32. It is understood that the reclosable spout 36 illustrated in FIG. 6 is described by way of example and that the invention also contemplates the use of other types of spouts including snaps, hatches and the like.

Referring back to FIGS. 1-3, the feed system 20 transfers a spout 36 from a hopper (not shown) to a location and position that the applicator system 24 can then pick up the spout 36 for installation to the carton 30. The feed system 20 may include a conveyor (not shown) and a vertical accumulator (not shown) to deliver the spout 36 to an escapement 50 having an U-shaped seat 52. The spout 36 is positioned such that the cap 48 is situated in the U-shaped seat 52 of the escapement 50 and the mounting flange 40 of the spout 36 faces the applicator system 24. The escapement 50 defines a push rod receiving hole 51 extending from the front surface to the rear surface of the escapement. A linear actuator or an air cylinder 56 (illustrated in FIGS. 19-22) is located immediately in front of the push rod receiving hole 51 of the escapement 50. The air cylinder 56 includes a push rod 57 extending through the push rod receiving hole 51. The push rod 57 is adapted to push the spout 36, seated on the U-shaped seat 52, onto a mandrel. The conveyor and the vertical accumulator may be similar to the type described in commonly assigned U.S. Pat. No. 5,484,374, incorporated herein by reference.

The ultrasonic sealer 18 is a known, commercially available device. The ultrasonic sealer 18 includes a hollow cylindrical ultrasonic welding head or horn 54. The welding head 54 defines a bore (not shown) having a diameter slightly larger than the outer diameter of the spout cap 48 and is adapted to surround the cap 48 when the ultrasonic sealer 18 is in the engagement position. The ultrasonic sealer 18 is slidably mounted on a guide 58 which allows the ultrasonic sealer 18 and its welding head 54 to move axially along the guide 58 from a retracted position to an engagement position and back to a retracted position. A conventional drive system (not shown) moves the ultrasonic sealer 18 along the guide 58. It should be noted that while the spout applicator machines of this embodiment and the following embodiments use an ultrasonic sealer to attach the spout to the container for illustrative purposes, it remains within the spirit and scope of the present invention to use other known bonding or sealing means to attach the spout to the container.

The linear actuator 22 includes a rod 60 capable of moving up and down in a vertical direction. The linear actuator 22 can be an air cylinder, a hydraulic cylinder and any other types of actuators capable of moving a component in a linear motion. The rod 60 includes a downwardly extending plate 62. The plate 62 defines an applicator system attachment hole (not shown) extending through the plate 62. The applicator system 24 is pivotably connected to the plate 62 of the rod 60. The applicator system 24 includes a pivot arm 64, a link assembly 66, two bearing blocks 68,70, and a shaft 114.

Figure 7:
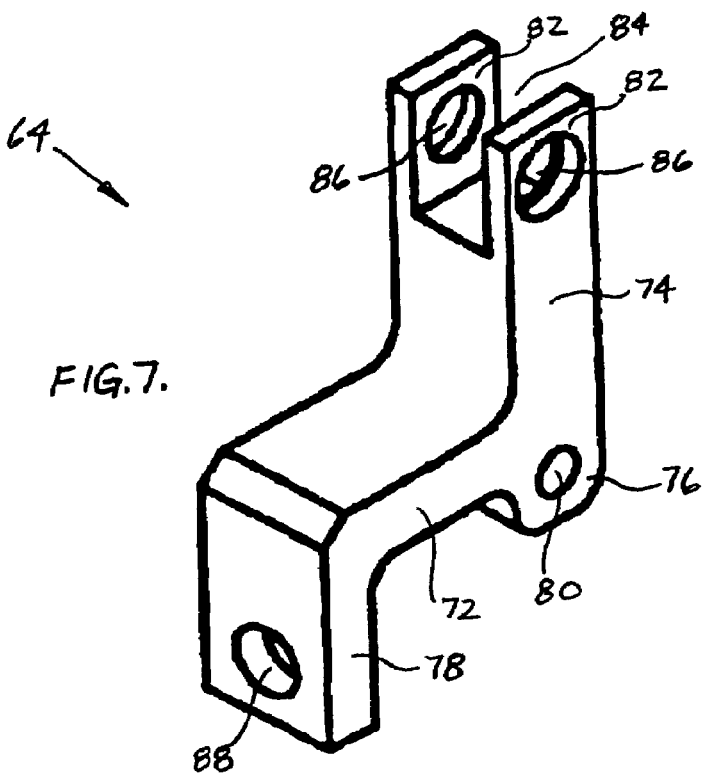
FIG. 7 is a perspective view of the pivot arm of the spout applicator machine as shown in FIG. 1.
Figure 8:
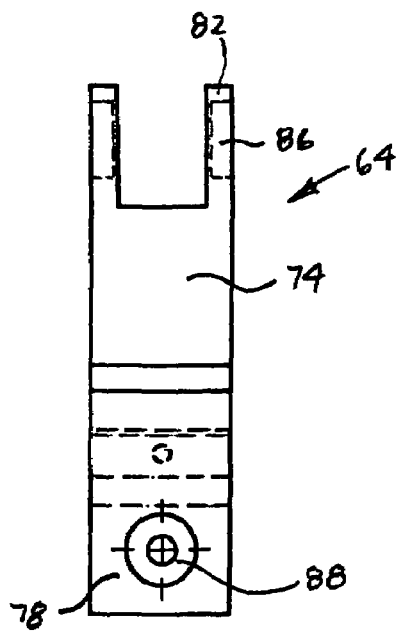
FIG. 8 is front view of the pivot arm of the spout applicator machine as shown in FIG. 1.
Figure 9:
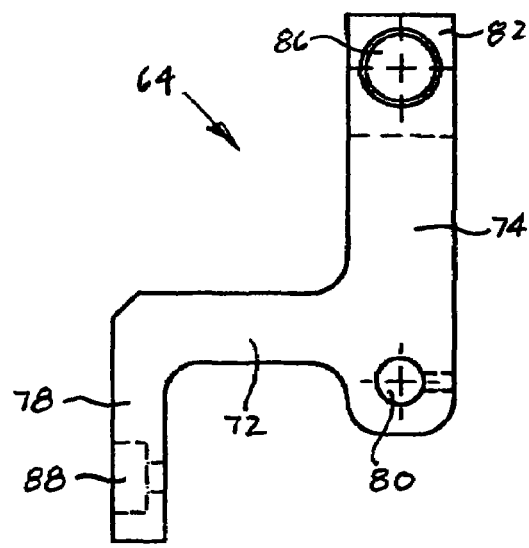
FIG. 9 is a side view of the pivot arm of the spout applicator machine as shown in FIG. 1.
Figure 10:
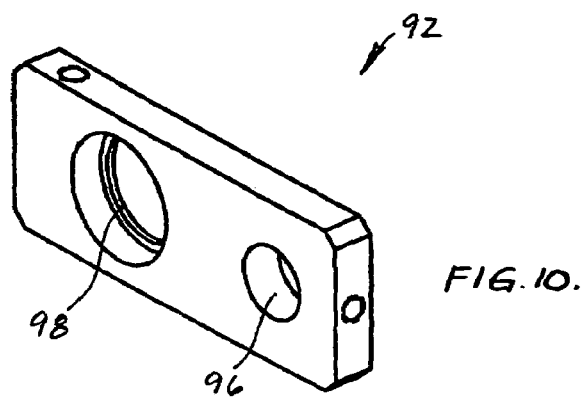
FIG. 10 is a perspective view of the link arm of the spout applicator machine as shown in FIG. 1.
Figure 11:
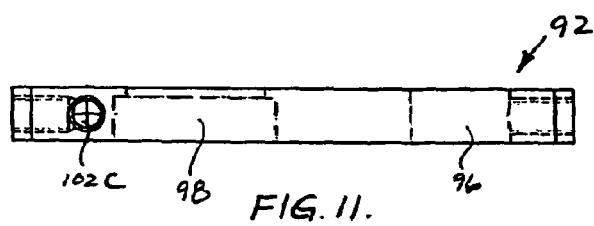
FIG. 11 is a front view of the link arm of the spout applicator machine as shown in FIG. 1.
Figures 12, 13, 14:
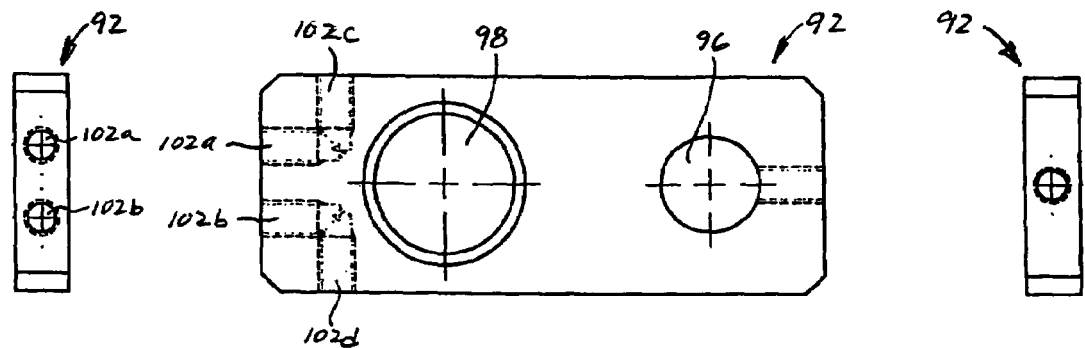
FIG. 12 is a bottom view of the link arm of the spout applicator machine as shown in FIG. 1.
FIG. 13 is a side view of the link arm of the spout applicator machine as shown in FIG. 1.
FIG. 14 is a top view of the link arm of the spout applicator machine as shown in FIG. 1.

The pivot arm 64, shown in FIGS. 2-3 and in detail in FIGS. 7-9, includes a horizontal section 72, an upwardly extending vertical section 74 extending from a first end of the horizontal section 72, a boss 76 extending downwardly from the first end of the horizontal section 72, and a downwardly extending anvil 78 extending from a second end of the horizontal section 72. A link arm attachment hole 80 extends through the boss 76. The end of the upwardly extending vertical section 74 is forked to include two lobes 82 and a notch 84 defined between the two lobes 82. Each lobe 82 defines a rod attachment hole 86. The rod attachment holes 86 of the pivot arm 64 and the applicator system attachment hole of the rod 60 are sized and located to allow a rod pin 87 to be inserted through the rod attachment holes 86 and the applicator system attachment hole. A mandrel attachment hole 88 extends from the front surface to the rear surface of the anvil 78. The mandrel attachment hole 88 is adapted to receive the attachment shaft of a mandrel 90 to be fixed to the anvil 78 of the pivot arm 64. The mandrel 90 can be of the type described in commonly assigned U.S. Pat. No. 6,085,489 to Bachner et al., incorporated herein by reference.

Figure 15:
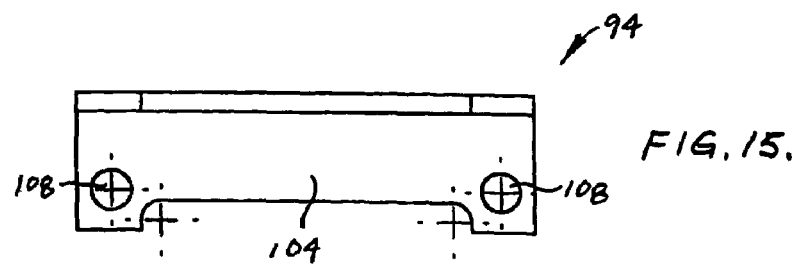
FIG. 15 is a rear view of the link bracket of the spout applicator machine as shown in FIG. 1.
Figure 16:
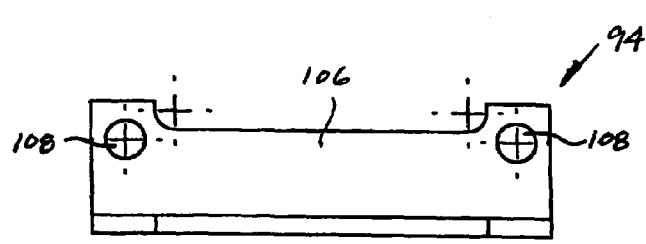
FIG. 16 is a top view of the link bracket of the spout applicator machine as shown in FIG. 1.
Figure 17:
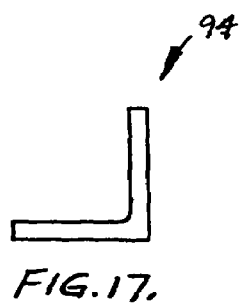
FIG. 17 is a side view of the link bracket of the spout applicator machine as shown in FIG. 1.
Figure 18:
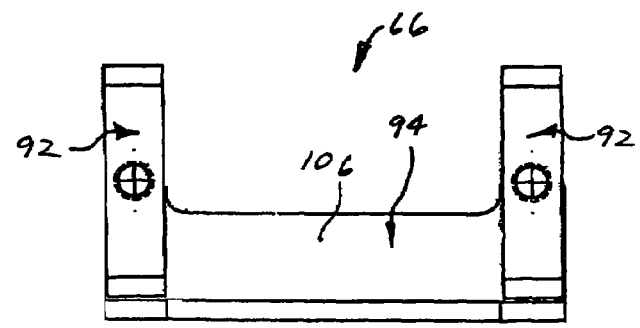
FIG. 18 is a top view of the link arms attached to the link bracket of the spout applicator machine as shown in FIG. 1.

The link assembly 66 includes two link arms 92 and a link bracket 94. The link arm 92, shown in detail in FIGS. 10-14, defines a shaft hole 96 at one end and a pivot arm attachment hole 98 at the other end. The pivot arm attachment hole 98 is adapted to receive a link pin 100 inserted through the pivot arm attachment hole 98 of the link arm 92 and the link arm attachment hole 80 of the pivot arm 64 to allow the link arm 92 to pivot relative to the pivot arm 64. The link arm 92 further defines two threaded bores 102a,102b extending from the bottom surface of the link arm 92, a threaded bore 102*c* extending from the front surface of the link arm 92, and a threaded bore 102*d* extending from the rear surface of the link arm 92. The link bracket 94, shown in detail in FIGS. 15-17, is L-shaped having a front plate 104 and a bottom plate 106. Each plate defines two holes 108. Each hole 108 is adapted to receive a screw or a bolt inserted through the hole 108 and threaded into one of the threaded bores 102*a*,102*b*,102*c*,102*d* of the corresponding link arm 92 to secure the link arm 92 to the link bracket 94. FIG. 18 illustrates two link arms 92 secured to the link bracket 94.

As illustrated in FIGS. 2 and 3, a bearing block 68,70 is fixed to each of the two side plates 12,14 forming the housing of the spout applicator machine 10. Since the bearing blocks 68,70 are fixed to the housing, the bearing blocks 68,70 will not move vertically or horizontally with the remainder of the applicator system 24. Each bearing block 68,70 defines a shaft retaining hole 110 and three threaded bores 112. The shaft retaining hole 110 accommodates and retains the end of a shaft 114 extending through the shaft holes 96 of the link arms 92. The three threaded bores 112 allow each bearing block 68,70 to be mounted to the corresponding side plate 12, 14.

Figure 19:
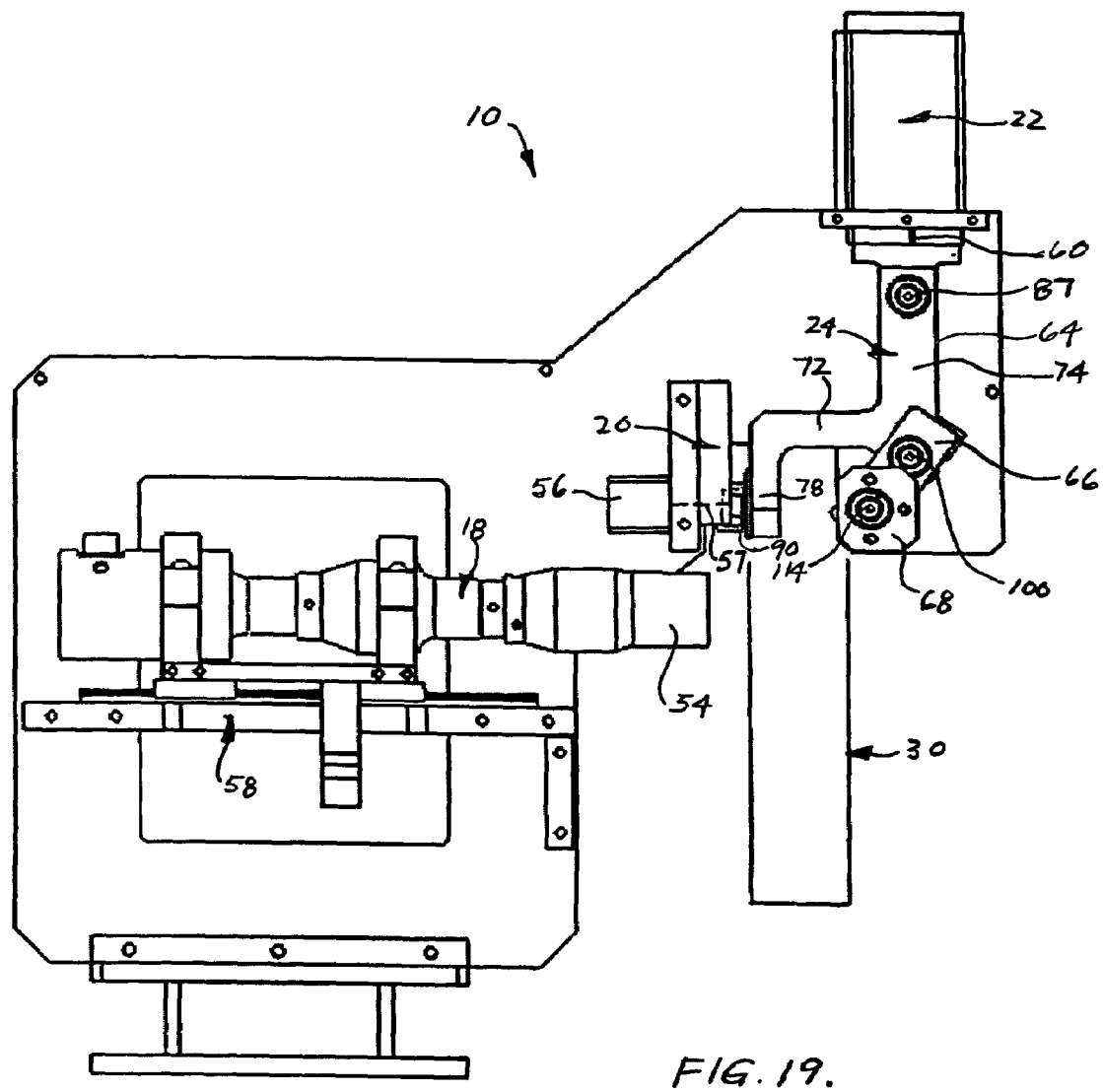
FIG. 19 is a side view of the spout applicator machine as shown in FIG. 1 with the rod of the linear actuator in the up position and the ultrasonic sealer in the retracted position.

The spout applicator machine 10, in accordance to the present invention, operates as follows. As illustrated in FIG. 19, when the rod 60 of the linear actuator 22 is in the up position, the mandrel 90 of applicator system 24 is positioned adjacent to the cylindrical cavity 46 of a spout 36 seated in the U-shaped seat 52 of the escapement. The push rod 57 of the air cylinder 56 applies a rearward force on the cap 48 to push and situate the spout 36 over the mandrel 90, such that the mandrel 90 is releasably engaged with the spout 36. For the purpose of describing the present invention, "releasably engage" describes a situation in which the mandrel temporarily engages the spout by means such as an interference fit between the mandrel and the spout.

Figure 20:
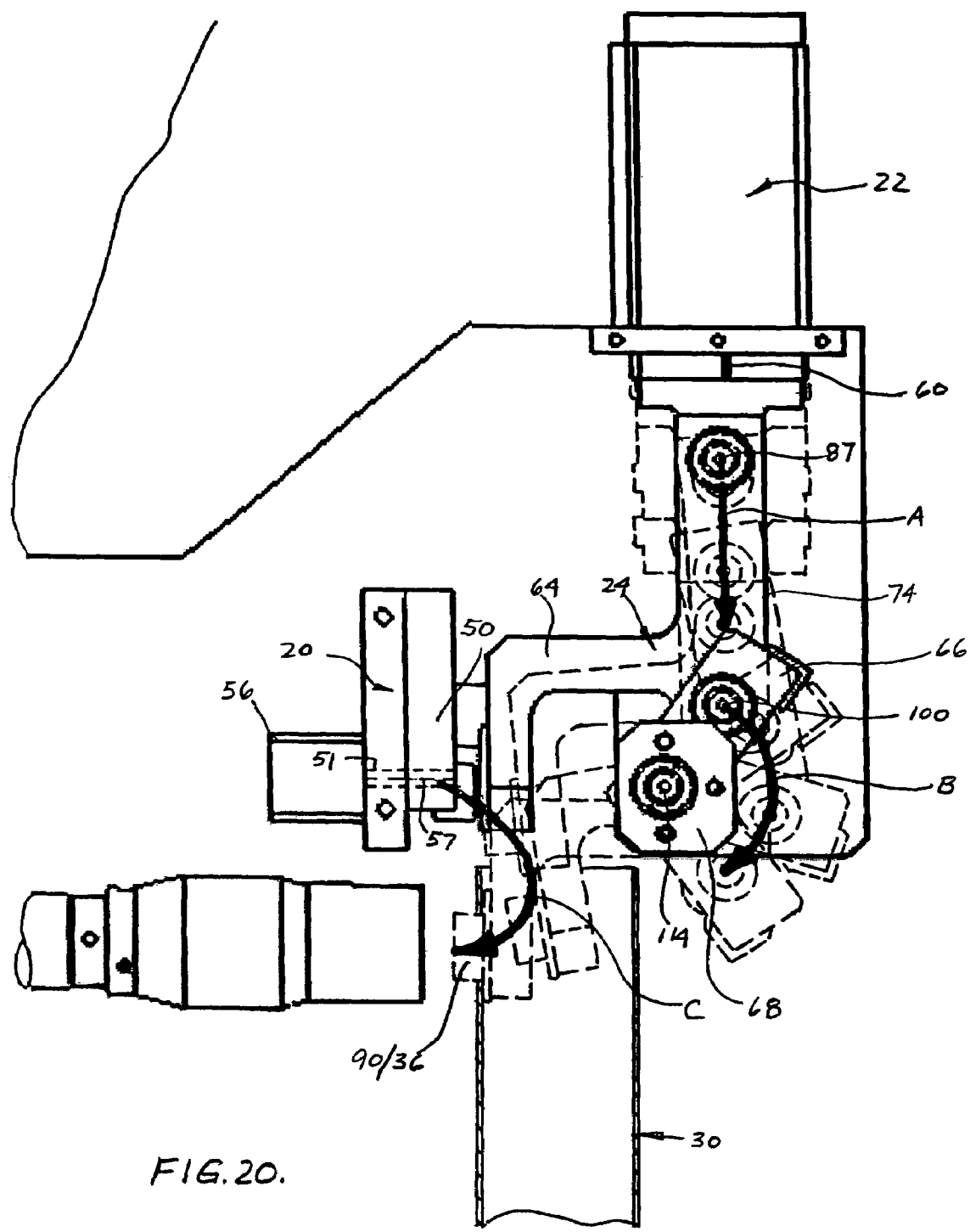
FIG. 20 is an enlarged side view of the spout applicator machine as shown in FIG. 1 illustrating the movement of the mandrel relative to the movement of the rod of the linear actuator.

FIG. 20 shows the arcuate movement of the mandrel 90, and the spout 36 releasably engaged thereon, relative to the vertical linear movement of the rod 60. As the rod 60 of the linear actuator 22 and the rod pin 87 move downwardly, as illustrated by arrow A, the rod 60 pushes the pivot arm 64 downwardly; thus, applying a downward force on the link pin 100. Since the end of the link arms 92, opposite the link pin 100, are fixed to the housing of the spout applicator machine 10 by the bearing shaft 114, the downward force applied to the link pin 100 will cause the link arms 92 to rotate clockwise around the bearing shaft 114. Therefore, rather than moving only in the downward direction, the link pin 100, which forms the junction between the pivot arm 64 and the link arms 92, moves in an arc motion around the bearing shaft 114 as illustrated by arrow B. In positions wherein the center point of the link pin 100 is located above the center point of the bearing shaft 114, a linear downward motion of the rod 60 will cause the link pin 100 to move in a downward and rearward direction. Since the mandrel 90 is attached to the pivot arm 64, the downward movement of the rod 60 will likewise cause the mandrel 90 to move in a downward and rearward direction. This rearward movement of the mandrel, which has been situated within the spout 36, will unseat the spout 36 from the U-shaped seat 52 of the escapement 50. Once the center point of the link pin 100 is located below the center point of the bearing shaft 114, further downward movement of the rod 60 causes the link pin 100 to move in a downward and forward direction, and likewise the mandrel 90 to move in a downward and forward direction.

The rod 60 continues to move downwardly until the spout cap 48 is inserted through the die cut hole 34 of the open-ended carton 30, wherein the mounting flange 40 of the spout 36 is in abutting relationship with the interior surface of the carton 30. The path of the mandrel 90, with the spout 36 attached thereon, is illustrated by Arrow C. As evident from Arrow C, the mandrel 90 and the spout 36 move in a single arc motion from the location where the mandrel 90 has been situated within the spout 36 to the location where the spout 36 is inserted through the die cut hole 34 of the carton 30. In other words, to move the mandrel 90 from the location where it has been situated within the spout 36 to the location where spout 36 is inserted through the die cut hole 34 of the carton 30 does not require at least two separate distinct motions as is required by prior art spout applicator machines: one motion to move the mandrel and spout downwardly to line up the spout with the die cut hole and another motion to move the mandrel and spout forward to insert the spout through the die cut hole.

This single arc motion by the mandrel of the spout applicator machine in accordance to the present invention is much simpler to operate than the prior art applicator machines that require two distinct motions. The applicator system, in accordance to the present invention, only requires one linear actuator, whereas the prior art applicator systems requires at least two linear actuators. The applicator system 24 of the present application is able to translate the vertical linear motion by the rod 60 of the linear actuator 22 into a single arc motion to move the mandrel 90 and the spout 36 from the location where the spout 36 was situated on the mandrel 90 to the location where the spout 36 is inserted through the hole 34 of the carton 30. For the purpose of describing the present invention, a "linear" motion is a straight non-curved motion. An "arc" motion is a smooth curved motion resembling part of the circumference of a circle or a bow. This ability to use only one linear actuator provides for significant savings in the initial cost of the machine, the maintenance cost of the machine, and the amount of energy to operate the machine.

Figure 21:
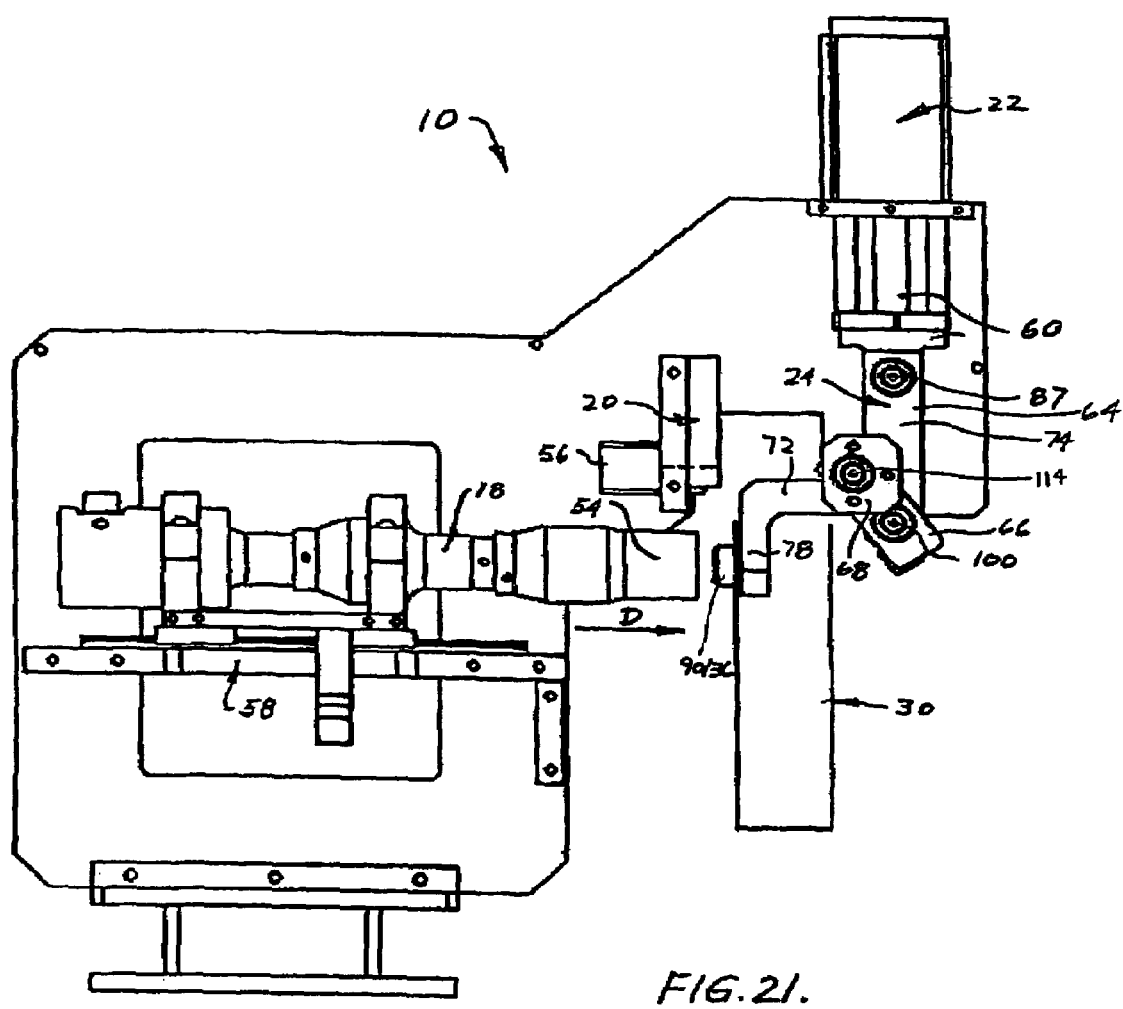
FIG. 21 is a side view of the spout applicator machine as shown in FIG. 1 with the rod of the linear actuator in the down position and the ultrasonic sealer in the retracted position.
Figure 22:
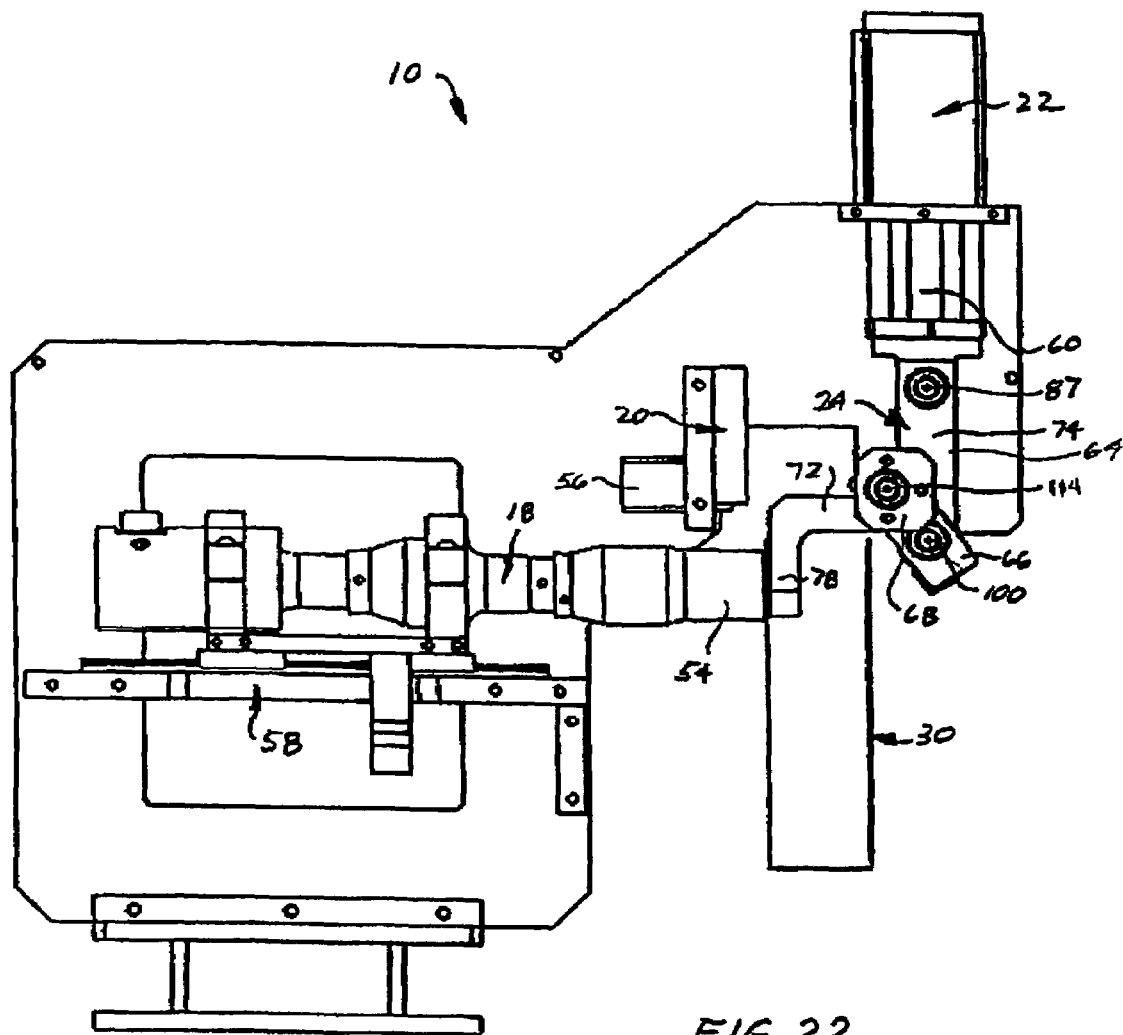
FIG. 22 is a side view of the spout applicator machine as shown in FIG. 1 with the rod of the linear actuator in the down position and the ultrasonic sealer in the engagement position.

FIG. 21 illustrates the spout applicator machine 10 after the spout 36 has been properly inserted through the die cut hole 34 of the carton 30. The next step is to weld the spout 36 to the carton 30. The ultrasonic sealer 18 slides axially along the guide 58, in the direction of Arrow D, until the terminal end of the welding head 54 engages the portion of the carton 30 radially outwardly of the die cut hole 34, to sandwich the mounting flange 40 and the carton 30 in between the welding head 54 and the mandrel 90, as illustrated in FIG. 22. In a well-known welding process, the welding head 54 then ultrasonically vibrates the region between the welding head 54 and the mandrel 90, thus heating the heat-sealable plastic laminate adjacent to the mounting flange, thereby welding the mounting flange 40 to the interior surface of the carton 30.

Upon completion of the welding process, the ultrasonic sealer 18 retracts to its original retracted position. The rod 60 then moves upwardly in a direction opposite of the Arrow A in FIG. 20. As the rod 60 moves to its original up position, the link pin 100 pivots around the bearing shaft 114 in a path opposite of Arrow B. The upwardly motion of the rod 60 causes the mandrel 90 to move a single arc path opposite of Arrow C. As the rod 60 approaches its fully up position, the upwardly movement of the rod 60 causes the mandrel 90 to move in a forward direction such that the mandrel 90 is positioned adjacent to the next spout seated on the escapement 50.

The foregoing process is repeated with the insertion of a spout through the cut out hole of the next carton and welding of the spout to the carton.

Figure 23:
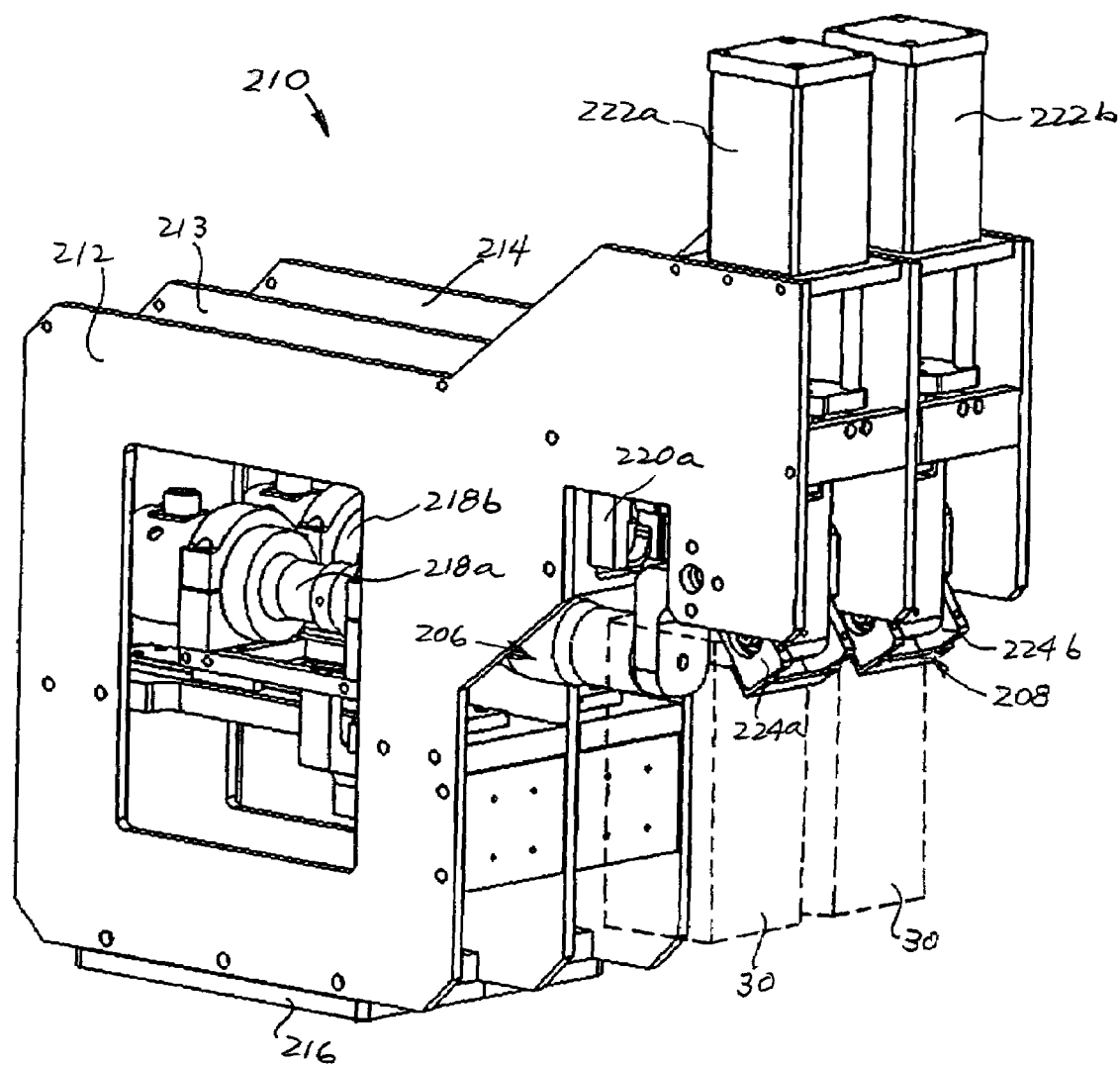
FIG. 23 is a rear perspective view of a first alternative spout applicator machine in accordance to the present invention.

FIG. 23 is a rear perspective view of a first alternative spout applicator machine 210 in accordance to the present invention. The first alternative spout applicator machine 210 is similar to the spout applicator machine 10 but is capable of inserting and attaching two spouts 36 to two folded open-ended paperboard cartons 30. The first alternative spout applicator machine includes a first ultrasonic sealer 218a, a second ultrasonic sealer 218b, a first feed system 220a, a second feed system 220b (not shown), a first linear actuator 222a, a second linear actuator 222b, a first applicator system 224a and a second applicator system 224b. Each of the ultrasonic sealers 218a,218b of the first alternative spout applicator machine 210 is identical to the ultrasonic sealer 18 of the spout applicator machine 10. Each of the feed systems 220a,220b of the first alternative spout applicator machine 210 is identical to the feed system 20 of the spout applicator machine 10. Each of the linear actuators 222a,222b of the first alternative spout applicator machine 210 is identical to the linear actuator 22 of the spout applicator machine 10. Each of the applicator systems 224a,224b of the first alternative spout applicator machine 210 is identical to the applicator system 24 of the spout applicator machine 10. The first alternative spout applicator machine 210 further includes a first side plate 212, an intermediate plate 213 and a second side plate 214 mounted on a stand 216 to form the housing of the spout applicator machine 210.

The first ultrasonic sealer 218a, first feed system 220a, the first linear actuator 222a, and the first applicator system 224a are positioned and located in between the first side plate 212 and the intermediate plate 213. The first ultrasonic sealer 218a, the first feed system 220a, the first linear actuator 222a, and the first applicator system 224a function as a single first unit 206 with the same process steps to insert and attach a spout 36 to a folded open-ended paperboard carton 30 as described above for the ultrasonic sealer 18, the feed system 20, the linear actuator 22 and the applicator system 24 of the spout applicator machine 10. The second ultrasonic sealer 218b, the second feed system 220b, the second linear actuator 222b, and the second applicator system 224b are positioned and located in between the intermediate plate 213 and the second side plate 214. The second ultrasonic sealer 218b, the second feed system 220b, the second linear actuator 222b, and the second applicator system 224b function as a single second unit 208 with the same process steps to insert and attach a spout 36 to a folded open-ended paperboard carton 30 as described above for the ultrasonic sealer 18, the feed system 20, the linear actuator 22 and the applicator system 24 of the spout applicator machine 10. Since the first and second units 206,208 each have their own ultrasonic sealers, feed systems, linear actuators, and applicator systems, each unit 206,208 is capable of functioning independently of the other unit 206,208. This arrangement also allows one of the units 206,208 to be operational while the other unit 206,208 is down. Alternatively, the first and second units 206,208 can be set up so that they operate approximately simultaneously in which the units 206,208 insert and attach two spouts at approximately the same time or the first and second units 206,208 can be set in sequence in which one of the units 206,208 inserts and attaches a spout 36 to its corresponding carton 30 after the other unit 206,208 has inserted and attached a spout 36 to its corresponding carton 30. It should be noted that while the first alternative spout applicator machine 210 is illustrated in FIG. 23 as having two units, more than two units can be packaged together to form the first alternative spout application machine.

Figure 24:
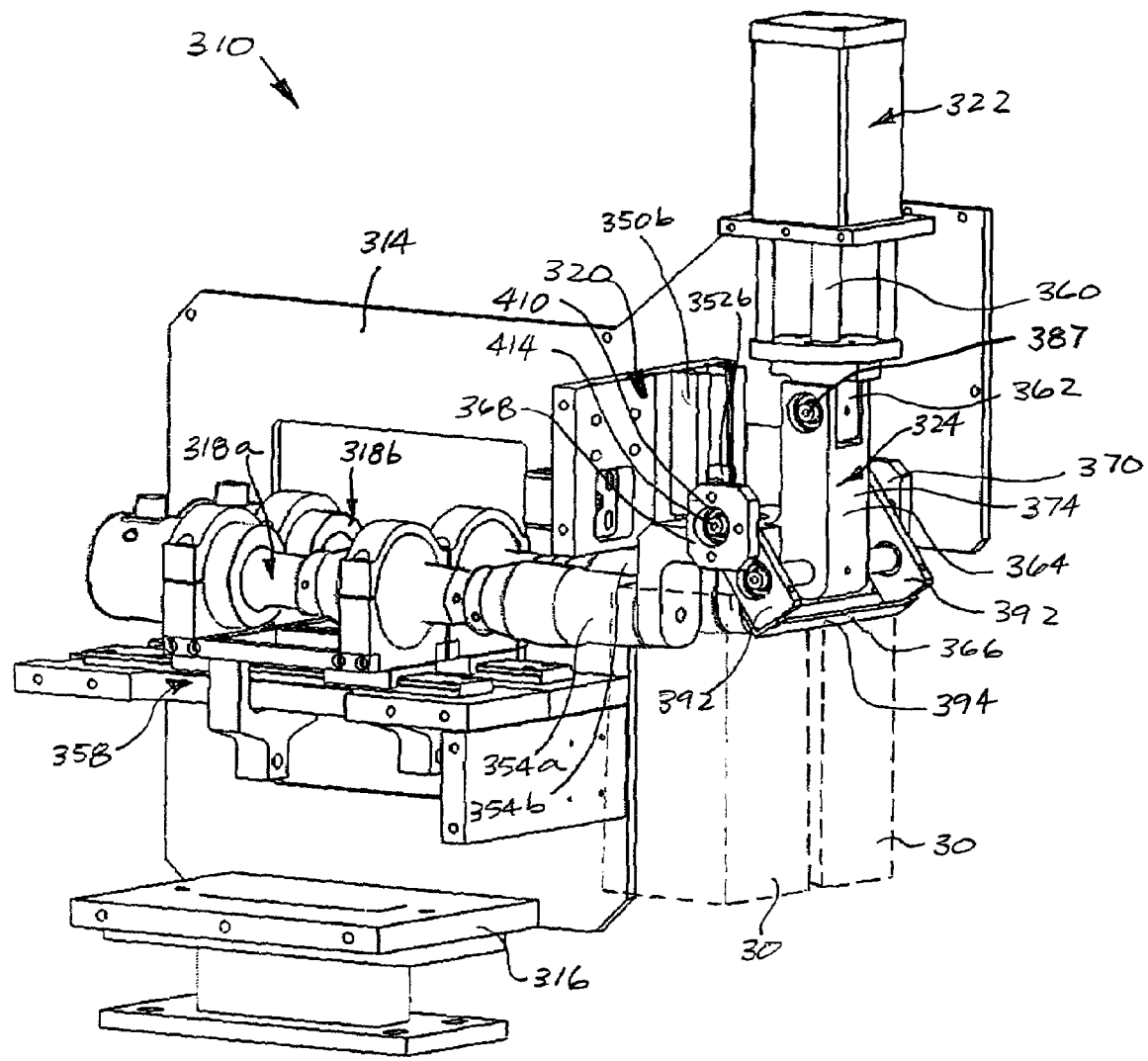
FIG. 24 is a rear perspective view of a second alternative spout applicator machine in accordance to the present invention with one of the side plates removed.
Figure 25:
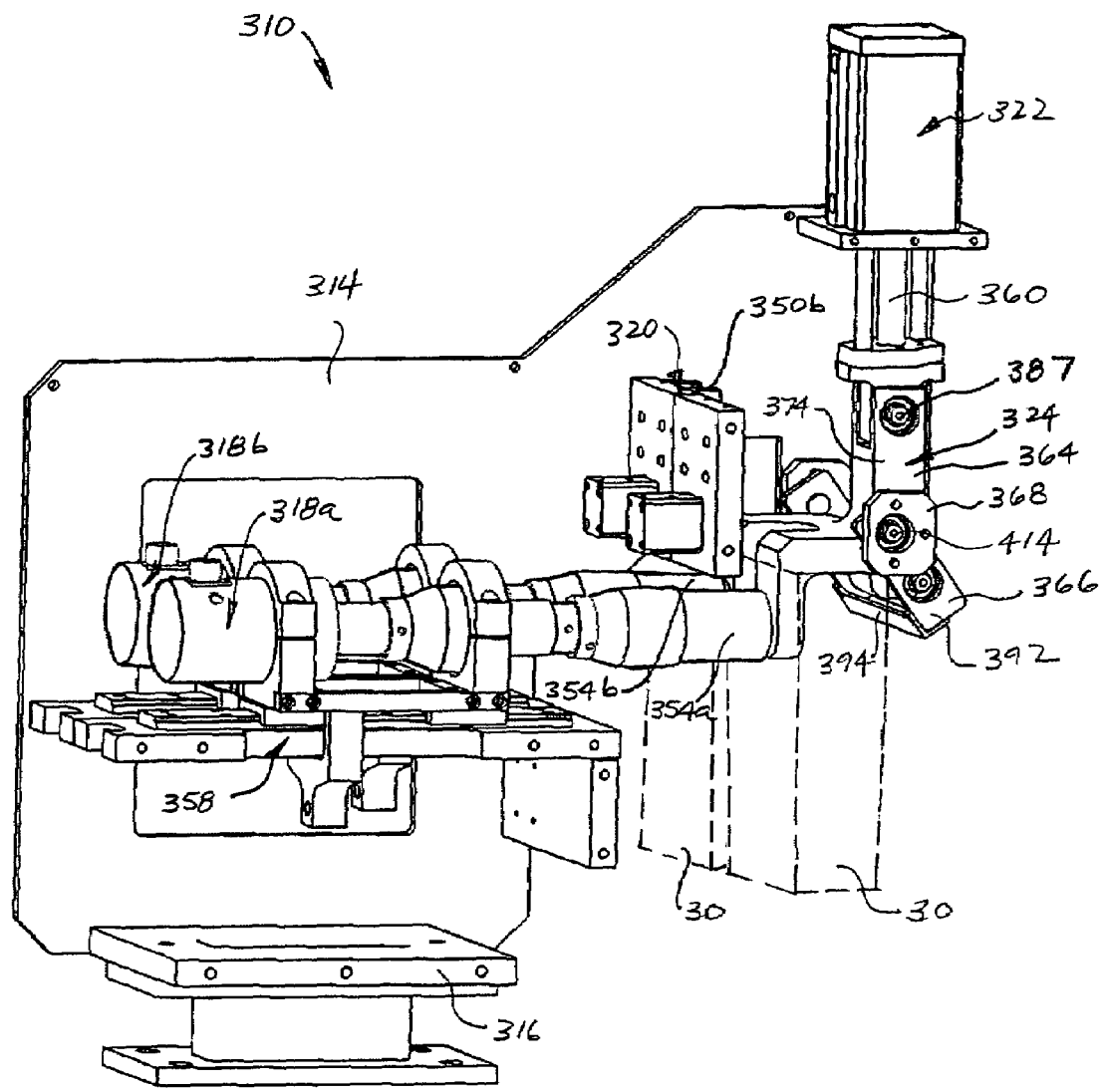
FIG. 25 is a front perspective view of the second alternative spout applicator machine as shown in FIG. 24.

FIGS. 24 and 25 are perspective views of a second alternative spout applicator machine 310 in accordance with the present invention. The second alternative spout applicator machine is similar to the spout applicator machine 10 but is capable of inserting and attaching two spouts to two folded open-ended paperboard cartons at the same time. The first alternative spout applicator machine 310 includes a first ultrasonic sealer 318a, a second ultrasonic sealer 318b, a feed system 320, a linear actuator 322, and an applicator system 324. The second alternative spout applicator machine 310 further includes two side plates 312 (not shown), 314 mounted on a stand 316 to form the housing of the spout applicator machine 310. The first ultrasonic sealer 318a, the second ultrasonic sealer 318b, the feed system 320, the linear actuator 322, and the applicator system 324 are positioned and located in between the two side plates 312,314.

The feed system 320 of the second alternative spout applicator machine 310 is similar to the feed system 20 of the spout applicator machine 10 with the exception that the feed system 320 is able to deliver two spouts 36 approximately simultaneously to locations and positions that the applicator system 324 can then simultaneously pick up for installation to two cartons 30. The feed system includes a first conveyer (not shown) and a first vertical accumulator (not shown) to deliver one of the spouts 36 to a first escapement 350a (not shown) having an U-shaped seat 352a (not shown). The feed system further includes a second conveyer (not shown) and a second vertical accumulator (not shown) to deliver the second spout 36 to a second escapement 350b having an U-shaped seat 352b. Each of the spouts 36 are delivered to the corresponding U-shaped seat 352a,352b in the same manner as the spout 36 is delivered to the U-shaped seat 52 of the spout applicator machine 10 as described above.

Each of the ultrasonic sealers 318a,318b of the second alternative spout applicator machine 310 is identical to the ultrasonic sealer 18 of the spout applicator machine 10. The ultrasonic sealers 318a,318b are both slidably mounted on a guide 358 which allows the ultrasonic sealers 318a,318b and its welding heads 354a,354b to move axially along the guide 358 from a retracted position to an engagement position and back to a retracted position.

The linear actuator 322 of the second alternative spout applicator machine 310 is identical to the linear actuator 22 of the spout applicator machine 10. The linear actuator 322 includes a rod 360 capable of moving up and down in a vertical direction. The rod 360 includes a downwardly extending plate 362. The applicator system 324 is pivotably connected to the plate 362 of the rod 360. The applicator system 324 includes a pivot arm 364, a link assembly 366, two bearing blocks 368,370 and a shaft 414.

The pivot arm 364, shown in detail in FIGS. 26 and 27, includes a U-shaped horizontal section 372, an upwardly extending vertical section 374 extending from the united end of the U-shaped horizontal section 372, a boss 376 extending downwardly from the united end of the horizontal section 372, a downwardly extending first anvil 378a extending from one of the split ends of the U-shaped horizontal section 372, and a downwardly extending second anvil 378b extending from the other split end of the U-shaped horizontal section 372. A link arm attachment hole 380 extends through the boss 376. The end of the upwardly extending vertical section 374 is forked to include two lobes 382 and a notch 384 defined between the two lobes 382. Each lobe 382 defines a rod attachment hole 386. The rod attachment holes 386 of the pivot arm 364 and the applicator system attachment hole of the rod 360 are sized and located to allow a rod pin 387 (illustrated in FIGS. 24 and 25) to be inserted through the rod attachment holes 386 and the applicator system attachment hole. Each anvil 378a,378b defines a mandrel attachment hole 388a,388b extending from the from the front surface to the rear surface of the anvil 378a,378b. Each mandrel attachment hole 388a,388b is adapted to receive the attachment shaft of a mandrel (not shown) to be fixed to the anvil 378a, 378b of the pivot arm 364.

The link assembly 366 (illustrated in FIGS. 24 and 25) includes two link arms 392 and a link bracket 394. The link arms 392 of the link assembly 366 are identical to the link arms 92 of the spout applicator machine 10. The link bracket 394 of the link 366 is similar to the link bracket 94 of the spout applicator machine 10 but is wider to accommodate the wider pivot arm 364. A bearing block 368,370 is fixed to each of the two side plates 312,314 forming the housing of the second alternative applicator machine 310. The bearing blocks 368, 370 of the second alternative spout applicator machine 310 are identical to the bearing blocks 68,70 of the spout applicator machine 10. Since the bearing blocks 368,370 are fixed to the housing, the bearing blocks 368,370 will not move vertically or horizontally with the remainder of the applicator system 324. A shaft 414 is retained at both ends by corresponding shaft retaining holes 410 defined in each bearing block 368,370. The shaft 414 of the second alternative spout applicator machine 310 is similar to the shaft 14 of the spout applicator machine 10 but is longer to accommodate the wider pivot arm 364.

The second alternative spout applicator machine 310 operates as follows. Each of the mandrels of the pivot arm 364 is releasable engaged with a corresponding spout 36 in the same manner as the mandrel 90 is releasably engaged with the spout 36 as described above for the spout applicator machine 10. The mandrels, and the corresponding spout 36 releasably engaged thereon each mandrel, move in the same arcuate movement as described above for the mandrel 90 of the spout applicator machine 10 and as shown in FIG. 20. This arcuate movement of the mandrels moves each spout 30 from the corresponding U-shaped seat 352a,352b to a location where each spout is inserted through the die cut hole of the corresponding carton 30. As with the mandrel 90 of the spout applicator machine 10, the mandrels of the second alternative spout applicator machine 310 moves in a single arc motion which is much simpler to operate than the prior art applicator machines that requires two distinct motions. After the spouts 36 have been properly inserted through the die cut holes of the corresponding cartons 30, the first ultrasonic sealer 318a slides axially along the guide 358 until the terminal end of the welding head 354a engages the corresponding carton 30 to sandwich the mounting flange of the corresponding spout 36 and the carton 30 in between welding head 354a and the corresponding mandrel. Simultaneously, the second ultrasonic sealer 318b slides axially along the guide 358 until the terminal end of the welding head 354b engages the corresponding carton 30 to sandwich the mount flange of the corresponding spout 36 and the carton 30 in between the welding head 354b and the corresponding mandrel. Each of the two welding heads 354a,354b then ultrasonically vibrates the region between the welding head 354a,354b and the corresponding mandrel to weld the mounting flange of each spout 36 to the interior surfaces of the corresponding carton 30.

Upon completion of the welding processes, the ultrasonic sealers 318a,318b retract to their original retracted position and the mandrels move in the same single arc path as described above for the mandrel 90 of the spout applicator machine 10, such that they are positioned adjacent to the next spouts seated on the escapements 350a,350b.

It should be noted that while the second alternative spout 310 is illustrated in FIGS. 24-27 as having two mandrels attached the pivot arm, it remains within the spirit and scope of the present invention to have additional mandrel(s) attached to the pivot arm to allow for more than two spouts to be inserted and attached to corresponding open-ended paperboard cartons at the same time.

Various features of the present invention have been described with reference to the above embodiment. It should be understood that modifications may be made without departing from the spirit and scope of the invention as represented by the following claims.

The invention claimed is:

1. A method for attaching a spout to a container having an open-ended top wit a hole formed therein for receiving a spout, said method comprising the steps of:
    providing a mandrel;
    situating a spout on said mandrel;
    moving said mandrel and said spout in a single arc motion from the location where said spout was situated on said mandrel to a location where said spout is inserted through said hole of said container;
    attaching said spout to said container; and
    withdrawing said mandrel from said spout.

2. The method according to claim 1 further comprising the step of moving said mandrel in a single arc motion from the location where the mandrel was withdrawn from said spout to a. location where a second spout is situated on said mantel.

3. The method according to claim 2 wherein said step of moving said mandrel in a single arc motion from the location where the mandrel was withdrawn from said spout to a location where a second spout is situated on the mandrel includes the steps of:
    providing a linear actuator;
    providing an applicator system pivotably mounted to said linear actuator,
    moving said linear actuator in a linear motion;
    translating said linear motion to an are motion which moves said mandrel and said spout from the location where the mandrel was withdrawn from said spout to a location where a second spout is situated on the mandrel.

4. The method according to claim 1 wherein said step of moving said mandrel and said spout in a single arc motion from the location where said spout was situated on said mandrel to a location where said spout is inserted through said hole of said container includes the steps of:
    providing a linear actuator;
    providing an applicator system pivotably mounted to said linear actuator;
    moving said linear actuator in a linear motion;
    translating said linear motion to an arc motion which moves said mandrel and said spout from the location where said spout was situation on said mandrel to a location where said spout is inserted through said hole of said container.

5. The method according to claim 1 wherein said step of attaching said spout to said container includes the steps of:
    providing an ultrasonic sealer;
    ultrasonically welding said spout to said container.

6. The method according to claim 1 wherein said step of attaching said spout to said container includes the steps of:
    providing an ultrasonic sealer wit a welding head;
    positioning said welding head to surround a portion of said spout;
    ultrasonically welding said spout to said container,
    retracting said welding head away from the spout.

7. The method according to claim 1 wherein said step of attaching said spout to said container attaches a flange of said spout to an interior surface of said container.

8. The method according to claim 1 wherein said step of attaching said spout to said container includes the steps of:

providing a mandrel;
providing a welding head;
sandwiching a portion of said container and flange of said spout in between said welding head and said mandrel;
welding said spout to said container.

9. The method according to claim 1 further comprising the steps of:
providing a second mandrel;
situating a second spout on said second mandrel;
moving said second mandrel and said second spout in a single arc motion from the location where said second spout was situated on said second mandrel to a location where said second spout is inserted through a hole of a second container;
attaching said second spout to said second container; and
withdrawing said second mandrel from said second spout.

10. The method according to claim 9 further comprising the steps of:
moving said mandrel in a single arc motion from the location where the mandrel was withdrawn from said spout to a location where a third spout is situated on said mandrel; and
moving said second mandrel in a single arc motion from the location where the second mandrel was withdrawn from said second spout to a location where a fourth spout is situated on said second mandrel.

* * * * *